Figure 1:
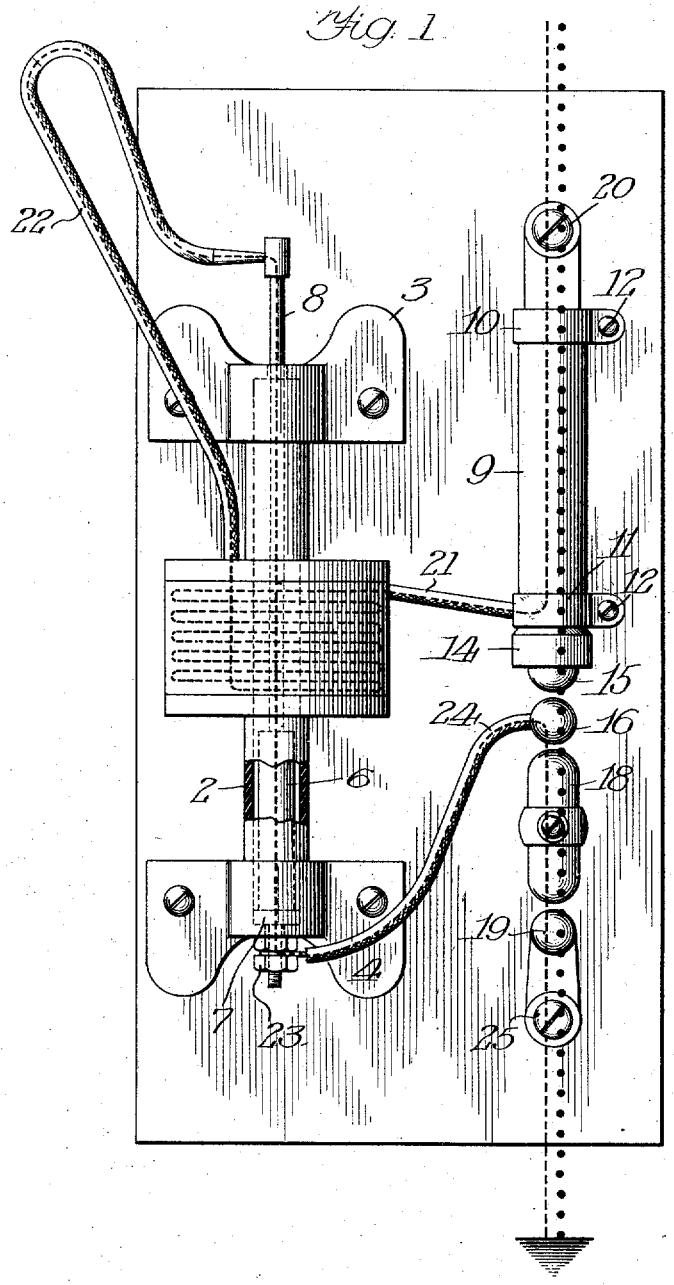

F. P. H. KNIGHT.

LIGHTNING ARRESTER.

APPLICATION FILED JAN. 5, 1910.

Reissued Aug. 9, 1910.

13,141.

3 SHEETS—SHEET 1.

Witnesses:
Robert H. Weir
W. Perry Kalm

Inventor:
Frank P. H. Knight
By James, Addington & Ames
Attys.

THE NORRIS PETERS CO., WASHINGTON, D. C.

F. P. H. KNIGHT.

LIGHTNING ARRESTER.

APPLICATION FILED JAN. 5, 1910.

Reissued Aug. 9, 1910.

13,141.

3 SHEETS—SHEET 2.

Witnesses:
Robert N. Weir
W. Perry Kalm

Inventor:
Frank P. H. Knight
By John Addington Ames
Atty.

THE NORRIS PETERS CO., WASHINGTON, D. C.

F. P. H. KNIGHT.

LIGHTNING ARRESTER.

APPLICATION FILED JAN. 5, 1910.

Reissued Aug. 9, 1910.

13,141.

3 SHEETS—SHEET 3.

Witnesses:
Robert F. Weir
W. Perry Hahn

Inventor:
Frank P. H. Knight
By: James, Addington & Ames.
Attys.

THE NORRIS PETERS CO., WASHINGTON, D. C.

UNITED STATES PATENT OFFICE.

FRANK P. H. KNIGHT, OF KEOKUK, IOWA, ASSIGNOR TO ELECTRIC SERVICE SUPPLIES COMPANY, OF CAMDEN, NEW JERSEY, A CORPORATION OF NEW JERSEY.

LIGHTNING-ARRESTER.

13,141. Specification of Reissued Letters Patent. Reissued Aug. 9, 1910.

Original No. 897,906, dated September 8, 1908, Serial No. 381,279. Application for reissue filed January 5, 1910. Serial No. 536,584.

*To all whom it may concern:*

Be it known that I, FRANK P. H. KNIGHT, a citizen of the United States, residing at Keokuk, in the county of Lee and State of Iowa, have invented new and useful Improvements in Lightning-Arresters, of which the following is a full, clear, concise, and exact description, reference being had to the accompanying drawing, forming a part of this specification.

My invention relates to improvements in protective devices such as are applied to various forms of electrical apparatus for the purpose of disrupting arcs which may form between contacts.

Particularly applicable is my invention to lightning arresters whose duty it is, as well known, to prevent injury to machines or other apparatus connected to the line due to a static discharge, such as lightning. The usual way of effecting this result is by providing a separate path for the discharge which it is compelled to follow. As this path does not include the apparatus to be protected, the latter is kept beyond reach of the destructive influence of the discharge. However, in lightning arresters efficient for this purpose the great difficulty has been experienced that the line-current tends to follow the discharge, and maintains a short-circuit to the ground by keeping up the arc or arcs across the discharging electrodes of the arrester. Various schemes have been resorted to, with more or less success to check this tendency of the line current to follow the discharge, but I conceived the idea of drawing the arc of the normal or line-current away from the discharge gap by a shunt path of lower resistance than said discharging-gap and breaking it mechanically, and without affecting the discharge-path during the operation of the circuit-breaker.

In order that my invention may be fully understood, I will now give a detailed description of the same, reference being had to the accompanying drawings, in which—

Figure 3:
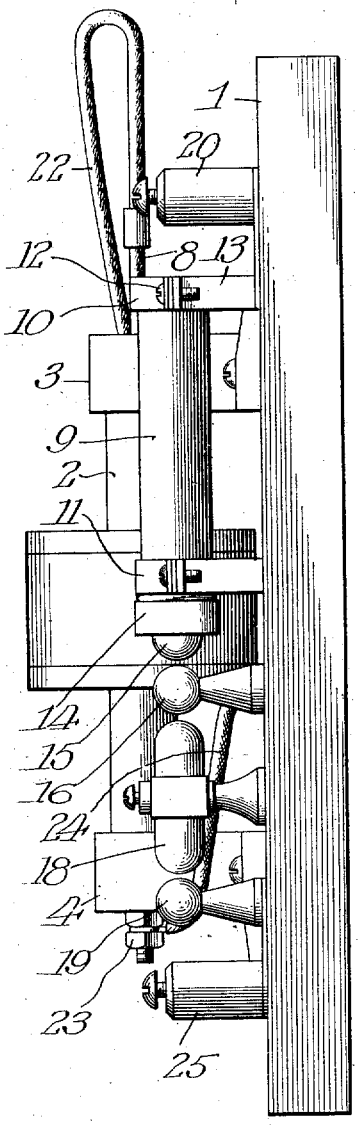
Figure 2:
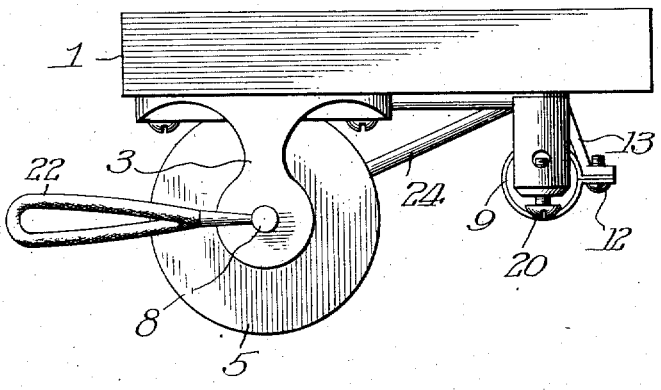
Figure 4:
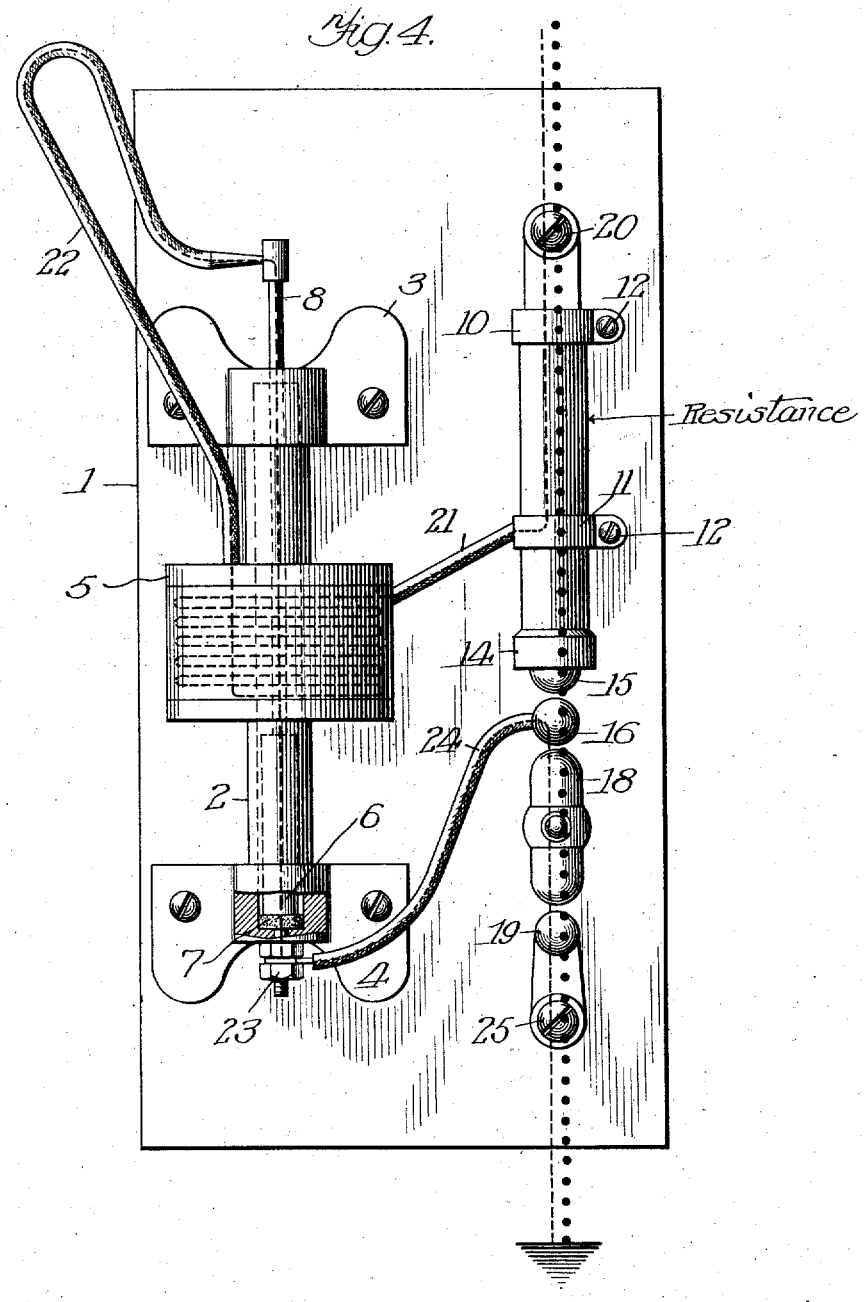

Figure 1 is a face view of one form of my invention; Fig. 2 is a top view thereof, while Fig. 3 is a side view of the same; and Fig. 4 is a face view of a modified form of my invention.

Although the drawings show the different parts of the device mounted upon the insulating base or panel 1, it is to be understood that certain of the parts (as, for instance, the circuit breaker) might just as well be located upon a separate support. The insulating tube 2 is held in place by brackets 3 and 4 which engage said tube at the upper and lower ends, respectively. Surrounding the tube and carried thereby, is an electro-magnetic coil 5 whose winding is in Fig. 1 indicated diagrammatically for a purpose hereinafter explained. This coil, when energized, actuates the magnetic core or plunger 6 which is capable of longitudinal movement in the tube 2. The core is adapted to rest normally upon the upper end of a carbon button 7 in the bottom of the tube. In this, its normal position, the core is below the coil so as to be drawn up by the latter upon flow of current therethrough. The upper end of the core carries a rod 8, of brass or other nonmagnetic conductive material, projecting through an opening in the top of the tube.

The resistance rod 9 is secured to the base by metallic clamps or brackets 10, 11, which in turn, are held in place by screws or bolts 12 threaded into arms or extensions 13 on the base. These arms also serve to space the resistance rod from the surface of the base. The lower end of this rod terminates in a metal cap 14 having a hemispherical projection 15 which constitutes one of a series of metallic discharge electrodes. Separated from electrode 15 by a sufficient air-gap, is the spherical electrode 16 carried by a standard 17, as shown in Fig. 3. Then comes the cylindrical electrode, 18, followed by another spherical electrode 19. This precise arrangement of the discharge-electrodes, also their number and shape, is here set forth by way of illustration only, and as not being of the essence of my invention. This will become apparent as the specification proceeds.

We now come to the electrical connections of the apparatus. One of the line terminals is connected to the binding post 20, which is electrically connected to the metallic clamp 10 and, therefore, to the resistance rod 9. One end of the coil 5 is connected to the lower end of the rod 9 by the conductor 21, while the other end of the coil is connected to the rod 8 through the flexible conductor 22. A suitable binding post 23 is electrically connected with the carbon button 7.

Discharge electrode 16 is in electric connection with the binding post 23 by means of the conductor 24.

The operation of the device is as follows: A lightning or similar discharge on the line wire will follow the path indicated by the dotted line Fig. 1, to wit, from binding post 20, through resistance rod 9, across the air-gaps formed by the discharge electrodes 15, 16, 18 and 19, to the binding post 25, (which is electrically connected with electrode 19) and finally to ground. The static discharge takes the above traced path in preference to a path through the coil 5, for the reason that such discharge, being oscillatory in its nature, would encounter too high a self-inductance in attempting to pass through the winding of the coil. The path across the air gaps is the path of least resistance for the discharge. Now, with the arc established across the air-gaps, the normal or line-current follows the path indicated by the dashed line in Fig. 1, to wit, from binding post 20 through resistance-rod 9, conductor 21, through coil 5, conductor 22, rod 8, core 6, carbon button 7, binding post 23, conductor 24, electrode 16, across an air-gap to electrode 18, across a second air-gap to electrode 19 binding post 25, and thence to the ground. The coil 5, therefore, becomes energized and raises its core 6, away from the contact 7. As the core and the contact 7 are in series with the spark-gaps between electrodes 16, 18 and 19, this separation of the core from contact 7 interrupts the flow of normal current to the ground and deënergizes the coil. As a consequence, the core drops to its normal position, and the instrument is reset to repeat the operation above set forth upon the passage of another discharge.

It will be noticed that the circuit through the coil 5 is in shunt to the air-gap formed between electrodes 15 and 16. But, in view of the fact that the resistance of this shunt-path is considerably lower than the resistance between the electrodes 15 and 16, the normal current chooses the path through the coil, and is thus drawn away from the spark gap between electrodes 15 and 16. It will further be noticed that I provide a permanent path for the discharge, as clearly indicated by the dotted lines in Figs. 1 and 4. I call this discharge path permanent for the simple reason that it remains unchanged or unaffected during the operation of the circuit-breaker. In other words, whatever the position of the movable core 6, whether in contact with the carbon button 7 or separated therefrom as when breaking the normal arc, the discharge path always remains in the same condition to permit the passage of static or abnormal current to ground.

The specific embodiment of my invention as herein described in detail, is for the sake of illustration only, and is no wise intended to place a limitation upon the scope of the invention as defined in the appended claims. As already stated, the exact number, or configuration, or position of the discharge electrodes is purely a matter of choice or skill, and may be varied to suit circumstances. Then, again, it is not necessary that only one spark-gap be shunted by the circuit-breaker: I may shunt two or more spark-gaps, as desired, or found expedient. Nor is it essential that a plurality of spark-gaps be arranged below the shunted one; a single spark-gap might be found to be sufficient. Furthermore, the position of the series spark-gaps may be altered in several ways, without affecting the operation of the device. Thus, for instance, at least one spark gap may be located on the upper end of the resistance rod, and still be in series with the coil 5. In some cases I may prefer to include in the shunt path a part of the resistance rod 9 in order to divert sufficient normal current through the coil to properly actuate the armature. Such an arrangement is illustrated in Fig. 4, where one end of the coil 5 is connected by conductor 21 with the bracket 11′ which is so situated on the resistance 9 that part of the same is in the shunt path of the normal current. Lastly, I do not wish to limit myself to the solenoid type of circuit breaker in shunt with an air gap or air-gaps; as any approved form of automatic circuit-breaker may be used with all the advantages herein mentioned, and without departing from my invention as set forth in the following claims. I will but add that by the term "automatic circuit breaker", as herein used, I mean a circuit breaker designed to automatically open the circuit and immediately close it.

Having thus described my invention, what I claim as new and desire to secure by Letters Patent of the United States is:

1. In a lightning arrester, the combination with a discharge path, of a path for the line current, the relative impedance of said paths being such that the lightning discharge will never pass by way of the path for the normal current, and an automatic circuit breaker arranged in the path of the normal current and adapted when operated to completely open the circuit and again close the same.

2. In a lightning arrester, the combination with a discharge path, of a shunt to a portion of said discharge path for the normal current, the relative impedance of said discharge path and shunt being such that the lightning discharge will never pass by the way of the shunt, and an automatic circuit breaker arranged in said shunt path and adapted when operated to open the circuit and again close the same.

3. In a lightning arrester, the combination with a discharge path having air gaps therein, of a shunt path for drawing the arc of the normal current away from one or more of said air gaps, the relative impedance of said paths being such that the lightning discharge will never pass by the way of the shunt path, and means for automatically opening said shunt path.

4. In a lightning arrester, the combination with a discharge path having air gaps therein, of an automatic circuit breaker in shunt to one or more of said air gaps and adapted to be operated by the normal current to open said shunt, the relative impedance of said discharge path and shunt being such that the lightning discharge will never pass by the way of the circuit breaker.

5. In a lightning arrester, the combination with a discharge path, of a circuit breaker associated therewith, the relative impedance of said discharge path and circuit breaker being such that the lightning discharge will never pass by the way of the circuit breaker.

6. In a lightning arrester, the combination with a discharge path having air gaps therein, a path for the normal current in shunt to one or more of said air gaps and in series with the other of said air gaps, the relative impedance of said discharge path and shunt being such that the lightning discharge will never pass by the way of the shunt, and a circuit breaker adapted when operated to open the circuit and again close the same arranged in said shunt path.

7. In a lightning arrester, the combination with a discharge path having air gaps therein, of a path for the normal current in shunt to one or more of said air gaps and in series to the other air gaps, the relative impedance of said paths being such that the lightning discharge will never pass by the way of the shunt, and means operated by the normal current for opening said shunt path.

8. In a lightning arrester, the combination with a discharge path, of a path for normal current, the relative impedance of said paths being such that the lightning discharge will never pass by way of the path for the normal current, the flow to ground being interrupted by interrupting in said shunt path the flow of current therein.

9. In a lightning arrester, the combination with a discharge path having air gaps therein, of a shunt to one or more of said air gaps, the relative impedance of said path being such that the lightning discharge will never pass through said shunt, a magnet coil in said shunt and arranged to interrupt the flow to ground over said discharge path by interrupting the flow of the normal current to ground in said shunt path.

10. In a lightning arrester, the combination with a discharge path having air gaps therein, of a shunt path for drawing the arc of the normal current away from one or more of said air gaps, the relative impedance of said paths being such that the static discharge will never pass by the way of the shunt path, and means for opening said shunt path to interrupt the flow to ground.

11. In a lightning arrester, the combination with a discharge path having air gaps therein, of a path for the normal current in shunt to one or more of said air gaps and in series with the other of said air gaps, the relative impedance of said discharge path and shunt path being such that the lightning discharge will never pass by way of the shunt, and means for mechanically interrupting the circuit in said shunt path.

12. In a lightning arrester, the combination with a discharge path including a resistance and plurality of electrodes having air gaps therebetween, of a path for the normal current in shunt to one or more of the air gaps, the relative impedance of said paths being such that the lightning discharge will never pass by the way of said shunt path, and an automatic circuit breaker in said shunt path operated by the normal current for interrupting the flow of normal current therein.

13. In a lightning arrester, the combination with a discharge path including a resistance and a plurality of electrodes having air gaps therebetween, of a path for the normal current in shunt to one or more of said air gaps and in series with said resistance and the other of said air gaps, the relative impedance of said paths being such that the lightning discharge will never pass by the way of said shunt path, and an automatic circuit breaker in said shunt path for interrupting the flow of normal current therein.

14. In a lightning arrester, the combination with a discharge path including a resistance and a plurality of discharge electrodes having air gaps therebetween, of a path for the normal current in shunt to one or more of said air gaps and in series with said resistance, the relative impedance of said paths being such that a lightning discharge will never pass by the way of the shunt path, a magnet coil in said shunt path, and means in said shunt path actuated by said coil for interrupting the flow of current therein.

15. In a lightning arrester, the combination with an insulating base, of a plurality of discharge electrodes arranged thereon in substantially a straight line to form a discharge path, and a circuit breaker mounted on said base comprising a stationary contact, a solenoid coil and a plunger, one of the terminals of said coil being connected to one of a pair of electrodes, the other terminal of the coil being connected to the plunger, and the stationary contact being connected with the other of the pair of electrodes to form a path for normal current, the relative impedance of said paths being such that the lightning discharge will never pass by the way of the path for the normal current.

16. In a lightning arrester, the combination with an insulating base, of a non-inductive resistance and a plurality of discharge electrodes arranged thereon in substantially a straight line to form a discharge path, and a circuit breaker mounted on said base comprising a stationary contact, a solenoid coil and a plunger, one of the terminals of said coil being connected to one of a pair of electrodes, the other terminal of the coil being connected to the plunger, and the stationary contact being connected with the other of the pair of electrodes to form a path for normal current, the relative impedance of said paths being such that the lightning discharge will never pass by the way of the path for the normal current.

17. In a lightning arrester, the combination with an insulating base, of a series of discharge electrodes arranged thereon in substantially a straight line to form a discharge path, and a circuit breaker mounted on said base comprising a stationary contact, a solenoid coil and a plunger, one of the terminals of said coil being connected to one of the series of electrodes, the other terminal of the coil being connected to the plunger, and the stationary contact being connected to another of the series of electrodes to form a path for normal current, the relative impedance of said paths being such that the lightning discharge will never pass by the way of the path for the normal current.

18. In a lightning arrester, the combination with an insulating base, of a non-inductive resistance and a series of discharge electrodes arranged thereon in substantially a straight line to form a discharge path, and a circuit breaker mounted on said base comprising a stationary contact, a solenoid coil and a plunger, one of the terminals of said coil being connected to one of the series of electrodes, the other terminal of the coil being connected to the plunger, and the stationary contact being connected to another of the series of electrodes to form a path for normal current, the relative impedance of said paths being such that the lightning discharge will never pass by the way of the path for the normal current.

19. In a lightning arrester, the combination with an insulating base, of a non-inductive resistance and a series of discharge electrodes arranged thereon in substantially a straight line to form a discharge path, and a circuit breaker mounted on said base comprising a stationary contact, a solenoid coil and a plunger one of the terminals of said coil being connected to the non-inductive resistance, the other terminal of the coil being connected to the plunger, and the stationary contact being connected to one of the series of electrodes to form a path for normal current, the relative impedance of said paths being such that the lightning discharge will never pass by the way of the path for the normal current.

20. In a lightning arrester, the combination with a discharge path including a resistance and a plurality of discharge electrodes having air-gaps therebetween, of a path for the normal current in shunt to part of said resistance and to one or more of the air-gaps, for drawing the arc of the normal current away from said last-mentioned air-gaps.

21. In a lightning arrester, the combination with a discharge path including a resistance and a plurality of discharge electrodes having air-gaps therebetween, of a path for the normal current in shunt to part of said resistance and to one or more of the air-gaps, and an automatic circuit breaker in said shunt path for interrupting the flow of normal current therein.

22. In a lightning arrester, the combination with a discharge path including a resistance and a plurality of discharge electrodes having air-gaps therebetween, of a path for the normal current in shunt to part of said resistance and to one or more of the air-gaps, and in series with the other of the air-gaps, and an automatic circuit breaker in said shunt path for disrupting the normal arc across said last mentioned air-gaps.

23. In a lightning arrester, the combination with a discharge path including a resistance and a plurality of discharge electrodes having air-gaps therebetween, of a path for the normal current in shunt to part of said resistance and to one or more of the air-gaps, and in series with the other of the air-gaps, a magnet coil in said shunt, and means actuated by said coil for disrupting the normal arc across said last mentioned air gaps.

In testimony whereof I have signed my name to this specification in the presence of two subscribing witnesses.

FRANK P. H. KNIGHT.

Witnesses:
G. W. Cox,
E. F. Cox.